(12) United States Patent
Adam (10) Patent No.: US 10,569,707 B1
(45) Date of Patent: Feb. 25, 2020

(54) EMERGENCY WARNING SYSTEM FOR WARNING VEHICLES AND ELECTRONIC DEVICES

(71) Applicant: William Adam, Shelton, WA (US)

(72) Inventor: William Adam, Shelton, WA (US)

(*) Notice: Subject to any disclaimer, the term of this patent is extended or adjusted under 35 U.S.C. 154(b) by 0 days.

(21) Appl. No.: 16/252,784

(22) Filed: Jan. 21, 2019

(51) Int. Cl.
| G08G 1/07 | (2006.01) |
| B60Q 5/00 | (2006.01) |
| B60Q 9/00 | (2006.01) |
| G08G 1/0965 | (2006.01) |

(52) U.S. Cl.
CPC .............. *B60Q 5/005* (2013.01); *B60Q 9/00* (2013.01); *G08G 1/0965* (2013.01)

(58) Field of Classification Search
None
See application file for complete search history.

(56) References Cited

U.S. PATENT DOCUMENTS

| 7,515,065 | B1 | 4/2009 | Bygrave et al. | |
| 9,224,294 | B1 | 12/2015 | St. John | |
| 2001/0038344 | A1* | 11/2001 | Garcia | G08G 1/0965 340/902 |
| 2003/0201884 | A1* | 10/2003 | Perez | B60Q 1/444 340/467 |
| 2006/0255966 | A1* | 11/2006 | McKenna | G08G 1/0965 340/902 |
| 2007/0216539 | A1* | 9/2007 | D'Antoni | G08G 1/0965 340/902 |
| 2016/0165424 | A1* | 6/2016 | El-Dinary | H04W 4/90 455/404.2 |

\* cited by examiner

*Primary Examiner* — Brent Swarthout
(74) *Attorney, Agent, or Firm* — Sanchelima & Associates, P.A.; Christian Sanchelima; Jesus Sanchelima (57) ABSTRACT

An emergency warning system for warning vehicles and electronic devices is disclosed. The emergency warning system comprises a first system. The first system is provided in a building or highway or road construction zone or in a first vehicle indicative of an emergency vehicle. The first system comprises an actuator, a radio-frequency signal generator communicatively coupled to the actuator. The radio-frequency signal generator is used to generate radio frequency signals at a particular frequency. Further, the first system comprises a transmitter for broadcasting the signals generated by the radio-frequency signal generator. Further, the emergency warning system comprises a second system provided in a second vehicle and at least one electronic device, present within a predefined distance of the first system. In order to warn the approach or presence of the first system, the actuator is actuated to generate and broadcast the radio frequency signals such that the second system and the at least one electronic device receives the signals warning users of the second system and the at least one electronic device of the approach or presence of the first system.

8 Claims, 5 Drawing Sheets

EMERGENCY WARNING SYSTEM FOR WARNING VEHICLES AND ELECTRONIC DEVICES

BACKGROUND OF THE INVENTION

1. Field of the Invention

The present disclosure generally relates to alert systems. More specifically, the present disclosure relates to an emergency warning system for warning vehicles and/or electronic devices in a vicinity or within a predefined area.

2. Description of the Related Art

It is known emergency vehicles such as ambulances, fire trucks, police vehicles and so on use loud sirens and flashing lights to alert road users to the presence of approaching emergency vehicles. With increase in use of vehicles on road, traffic congestion poses hurdle for the emergency vehicles in reaching the destination and limits the effectiveness of the services associated with the emergency vehicle. Further, with developments in infotainment available in the vehicles and distractions, passengers in the vehicles do not pay attention to the loud sirens and/or flashing lights. The distractions may be caused due to variety of reasons including, but not limited to passengers (infants, children, young adults, etc.), stereo systems, eating, drinking, cellular/electronic devices (even when they are hands free), emotions from anxiety, stress, etc., from physical, mental, social, relationship, etc. incidents, and the list can go on.

Further, passengers while in conversation tend to not pay attention to the sirens or the flashing lights. In addition, the vehicles come with "sound-proof" arrangement, as a result, when operated with air conditioning on, windows closed, and entertainment systems on, it is difficult for the passengers to hear the sirens of the emergency vehicle. The problem is compounded with the installation of automotive telematics (the wireless delivery of communication, information & other content, e.g., voice messages, e-mail) between the vehicle, the occupants and external sources.

Furthermore, with increase in use of electronic devices, people do not pay attention whether they are in the vehicle or while walking on a footpath. This poses greater problem in paying attention to the sirens and/or flashing lights used by the emergency vehicles to alert road users to the presence of approaching emergency vehicles.

Several systems have been proposed in the past to alert road users to the presence of approaching emergency vehicles. One such example is disclosed in a United States patent application 20060255966A1. In US20060255966A1, it is disclosed that a common inexpensive device such as an automotive internal rear view mirror, cell phone, or CHMBL (center high mounted brake light) incorporates an emergency warning system to detect a predefined signal emitted by a right of way vehicle such as an ambulance, police car, fire engine, or train. The right of way vehicle sends out a specific predefined signal to a predefined area. The specific predefined signal is picked up by a receiver of the present emergency warning system, which is preferably housed in a rear view mirror or cell phone, and which is always on, whether the internal rear view mirror, cell phone, or CHMBL is powered on or powered off. Then, after verification of the specific predefined signal, the internal rear view mirror, cell phone or CHMBL emits a warning, preferably an audio warning from a speaker housed in the internal rear view mirror, cell phone, or CHMBL. The emergency warning system can be incorporated into a telematics unit.

Another example is disclosed in a United States patent application 20070216539. In US20070216539, it is disclosed that a system for warning an occupant of a non-emergency vehicle of the approach of an emergency vehicle has a means for transmitting a signal, installed in the emergency vehicle, and a means for receiving the signal, installed in the non-emergency vehicle. The receiver is integrated into the electrical system of the non-emergency vehicle so that it is energized whenever an ignition system of the vehicle is engaged. When a transmitted signal, preferably a radio frequency signal, received by the receiver has a strength that exceeds threshold strength, the receiver causes at least one of a visible or audible indicator in the non-emergency vehicle to be activated and remain activated as long as the signal is received at strength above the threshold level. In many embodiments, the transmitter is activated anytime the emergency lights on the emergency vehicle are activated.

Another example is disclosed in a United States patent application 20010038344A1. In US20010038344A1, an alarm system for alerting drivers and passengers of a non-emergency vehicle to the approximate presence of an emergency vehicle which may be approaching the particular non-emergency vehicle. In one embodiment, an alarm, such as a blinking light or the like, is generated within the non-emergency vehicle or non-emergency vehicles. In another embodiment, a positioning system is also provided and displays the approximate position of the emergency vehicle, such that the driver or passengers of the non-emergency vehicle or vehicles may be apprised of the presence of and approximate location and direction of that emergency vehicle.

Yet another example is disclosed in a United States granted patent U.S. Pat. No. 7,515,065. In U.S. Pat. No. 7,515,065, a method for alerting road users to the presence of an emergency vehicle is disclosed. The method for alerting road user to the presence of an emergency vehicle may include receiving a short range signal, the signal including information regarding an emergency vehicle, decoding the signal, notifying a user, and transmitting the information regarding an emergency vehicle via a short range wireless signal. Each vehicle may include a short-range wireless signal transceiver, which could create a daisy chain distribution mechanism to distribute the information regarding an emergency vehicle to a first vehicle than to a second vehicle quickly and efficiently.

Yet another is disclosed in a United States granted patent U.S. Pat. No. 9,224,294B1. In U.S. Pat. No. 9,224,294B1, it is disclosed that a factory installed automobile emergency vehicle warning display system to alert a motorist of an approaching emergency vehicle as the emergency vehicle transmits an RF (or other) signal that is received by a sensory-receiver. The sensory-receiver then communicates to a visual-alarm to display a message and to an audible-alarm to transmit a corresponding audible message through a speaker.

Although the disclosures discussed above are effective in alerting vehicles of the presence or approaching of the emergency vehicle, they have few problems. For instance, the warning systems described in the prior art are expensive to install in the vehicles. Further, they cannot be used to broadcast warnings or precautions issued by government authorities to a large number of people at once. As a result, the functions of the existing systems are very limited.

Other documents describing the closest subject matter provide for a number of more or less complicated features that fail to solve the problem in an efficient and economical way. None of these patents suggest the novel features of the present invention. Specifically, none of the disclosures in the art disclose an emergency warning system for warning vehicles and/or electronic devices of approach or presence of an emergency vehicle or a building or a highway or road construction zone and also capable of alerting people of the warnings or precautions issued by government authorities.

Therefore, there is a need in the art for an emergency warning system for warning vehicles and/or electronic devices of approach or presence of an emergency vehicle or a building or a highway or road construction zone and also capable of alerting people of the warnings or precautions issued by government authorities.

SUMMARY OF THE INVENTION

It is one of the main objects of the present invention to provide an emergency warning system for warning vehicles and/or electronic devices of approach or presence of an emergency vehicle or a building or a highway or road construction zone and that avoids the drawbacks of the prior art.

It is one object of the present invention to provide an emergency warning system capable of alerting people of the warnings or precautions issued by government authorities.

It is one object of the present invention to provide an emergency warning system for warning vehicles and electronic devices. The emergency warning system comprises a first system. The first system is provided in a building or a highway or road construction zone or in a first vehicle indicative of an emergency vehicle. The first system comprises an actuator, a radio-frequency signal generator communicatively coupled to the actuator. The radio-frequency signal generator is used to generate radio frequency signals at a particular frequency. Further, the first system comprises a transmitter for broadcasting the signals generated by the radio-frequency signal generator. Further, the emergency warning system comprises a second system provided in a second vehicle and at least one electronic device, present within a predefined distance of the first system. In order to warn the approach or presence of the first system, the actuator is actuated to generate and broadcast the radio frequency signals such that the second system and the at least one electronic device receives the signals warning users of the second system and the at least one electronic device of the approach or presence of the first system.

Further objects of the invention will be brought out in the following part of the specification, wherein detailed description is for the purpose of fully disclosing the invention without placing limitations thereon.

BRIEF DESCRIPTION OF THE DRAWINGS

With the above and other related objects in view, the invention consists in the details of construction and combination of parts as will be more fully understood from the following description, when read in conjunction with the accompanying drawings in which.

DETAILED DESCRIPTION OF THE EMBODIMENTS OF THE INVENTION

The following detailed description is intended to provide example implementations to one of ordinary skill in the art, and is not intended to limit the invention to the explicit disclosure, as one or ordinary skill in the art will understand that variations can be substituted that are within the scope of the invention as described.

The present disclosure discloses an emergency warning system for warning vehicles and electronic devices. The emergency warning system comprises a first system. The first system is provided in a building or a highway or road construction zone or in a first vehicle indicative of an emergency vehicle. The first system comprises an actuator, a radio-frequency signal generator communicatively coupled to the actuator. The radio-frequency signal generator is used to generate radio frequency signals at a particular frequency. Further, the first system comprises a transmitter for broadcasting the signals generated by the radio-frequency signal generator. Further, the emergency warning system comprises a second system provided in a second vehicle and at least one electronic device, present within a predefined distance of the first system. In order to warn the approach or presence of the first system, the actuator is actuated to generate and broadcast the radio frequency signals such that the second system and the at least one electronic device receives the signals warning users of the second system and the at least one electronic device of the approach or presence of the first system.

Various features and embodiments of an emergency warning system for warning vehicles and electronic devices of approach of an emergency vehicle explained in conjunction with the description of FIGS. 1-6.

Figure 1:
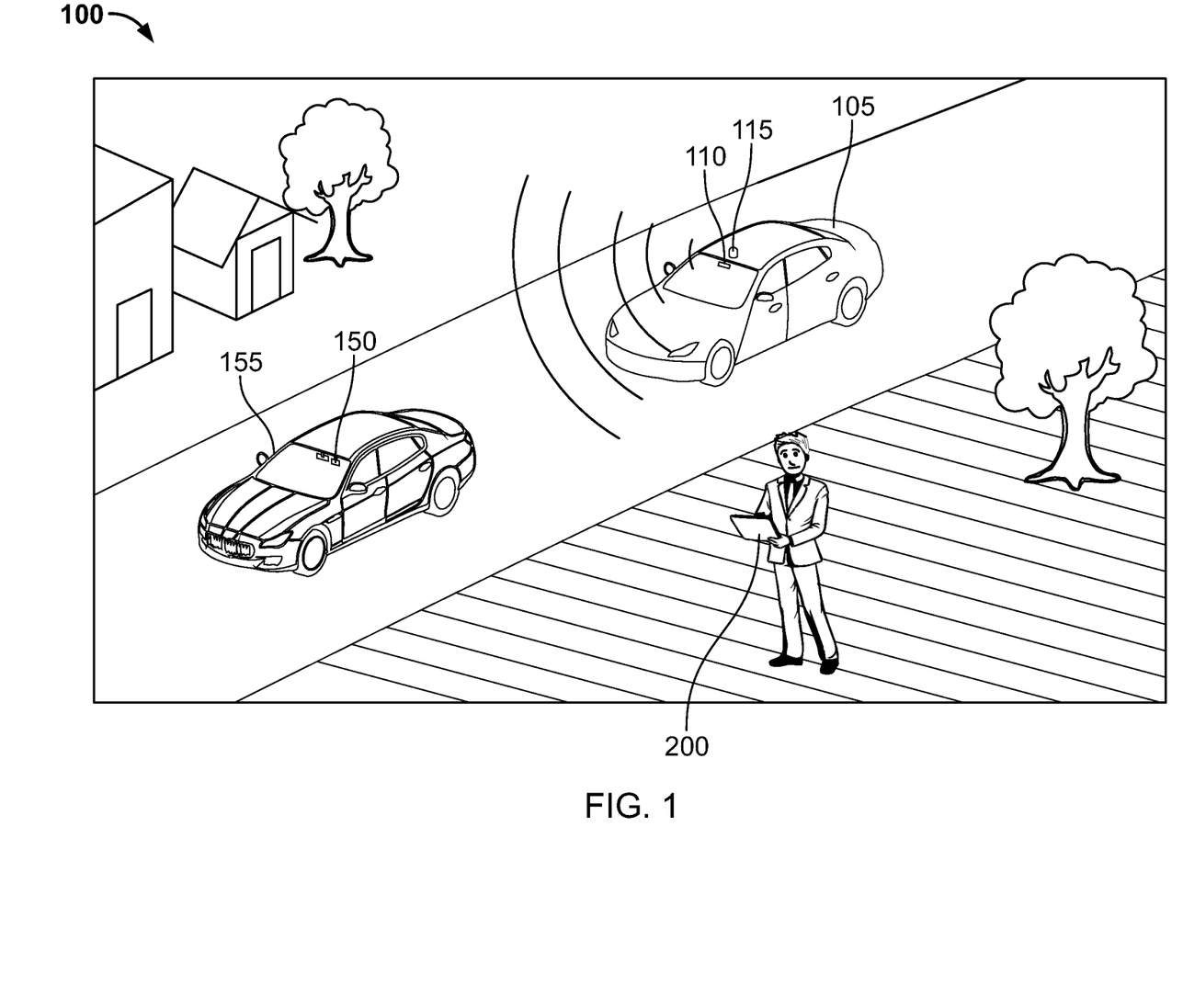
FIG. 1 illustrate a schematic diagram of an emergency warning system 100 for warning vehicles 155 and electronic devices 200 of approach of an emergency vehicle 105, in accordance with one embodiment of the present disclosure.

Referring to FIG. 1, a schematic diagram of an emergency warning system 100 for warning vehicles and electronic devices of approach of an emergency vehicle is shown, in accordance with one embodiment of the present disclosure. The emergency warning system 100 comprises a first system 110 provided in a first vehicle 105. The first vehicle 105 may indicate a vehicle used by emergency personnel. Examples of the first vehicle 105 may include, but not limited to, a police vehicle, an ambulance, a fire truck and so on. The vehicle used may be a car, motorcycle, a truck, or so on.

The first system 110 may be installed inside the first vehicle 105. In one example, the first system 110 may be installed at a dashboard (not shown) of the first vehicle 105. In another example, the first system 110 may be installed at a rear view mirror (not shown) of the first vehicle 105.

Figure 2:
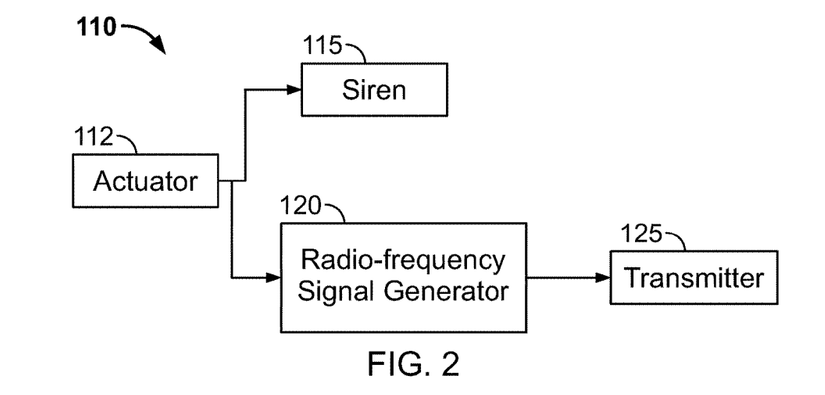
FIG. 2 illustrates a block diagram of a first system 110 provided in the emergency vehicle 105, in accordance with one embodiment of the present disclosure.

Referring to FIG. 2, a block diagram of the first system 110 is shown, in accordance with one embodiment of the present disclosure. The first system 110 may comprise an actuator 112. The actuator 112 may indicate a switch or toggle provided at the dashboard. The actuator 112 may be provided proximity to a driver of the first vehicle 105. Further, the first system 110 may comprise a siren 115 communicatively coupled to the actuator 112. In one example, the siren 115 may be provided at outside of the first vehicle 105 as shown in FIG. 1. It is understood that the siren 115 is used to produce loud noise.

Further, the first system 110 comprises a radio-frequency signal generator 120. The radio-frequency signal generator 120 may be communicatively coupled to the actuator 112. It should be understood that actuating or pressing the actuator 112 might trigger the radio-frequency signal generator 120 to turn ON. In one exemplary embodiment, the first system 110 may comprise a transmitter 125 communicatively coupled to the radio-frequency signal generator 120.

It should be understood that radio-frequency signal generator 120 might be configured to generate radio waves at a particular frequency when triggered by actuation of the actuator 112. It is to be noted that the radio-frequency signal generator 120 may be configured to generate radio waves or radio frequency signals at a particular frequency capable of reaching certain distance. For example, the radio-frequency signal generator 120 may generate the signal, which can be broadcasted within a radius of 500 meters. Similarly, the radio-frequency signal generator 120 may be configured to generate the signal at any radius based on the need. In one implementation, the transmitter 125 may be used to transmit or broadcast the radio-frequency signal generated by the radio-frequency signal generator 120.

Figure 3:
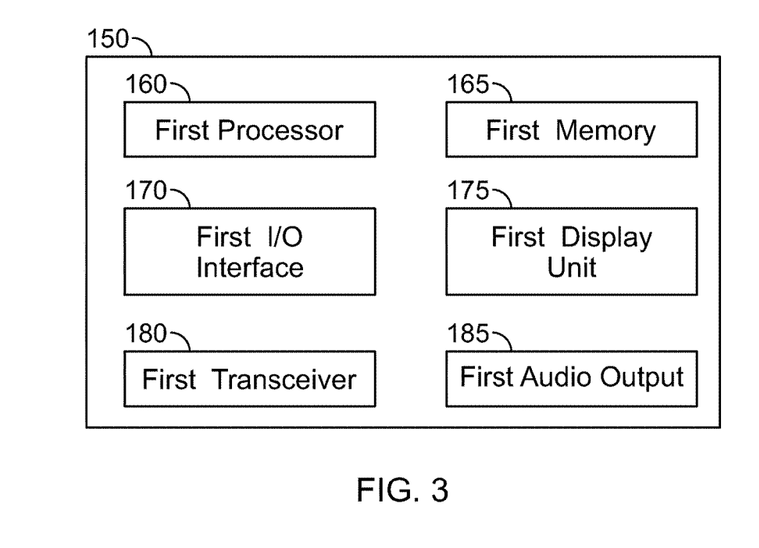
FIG. 3 illustrates a second system 150 provided in the second vehicle 155, in accordance with one embodiment of the present disclosure.
Figure 5:
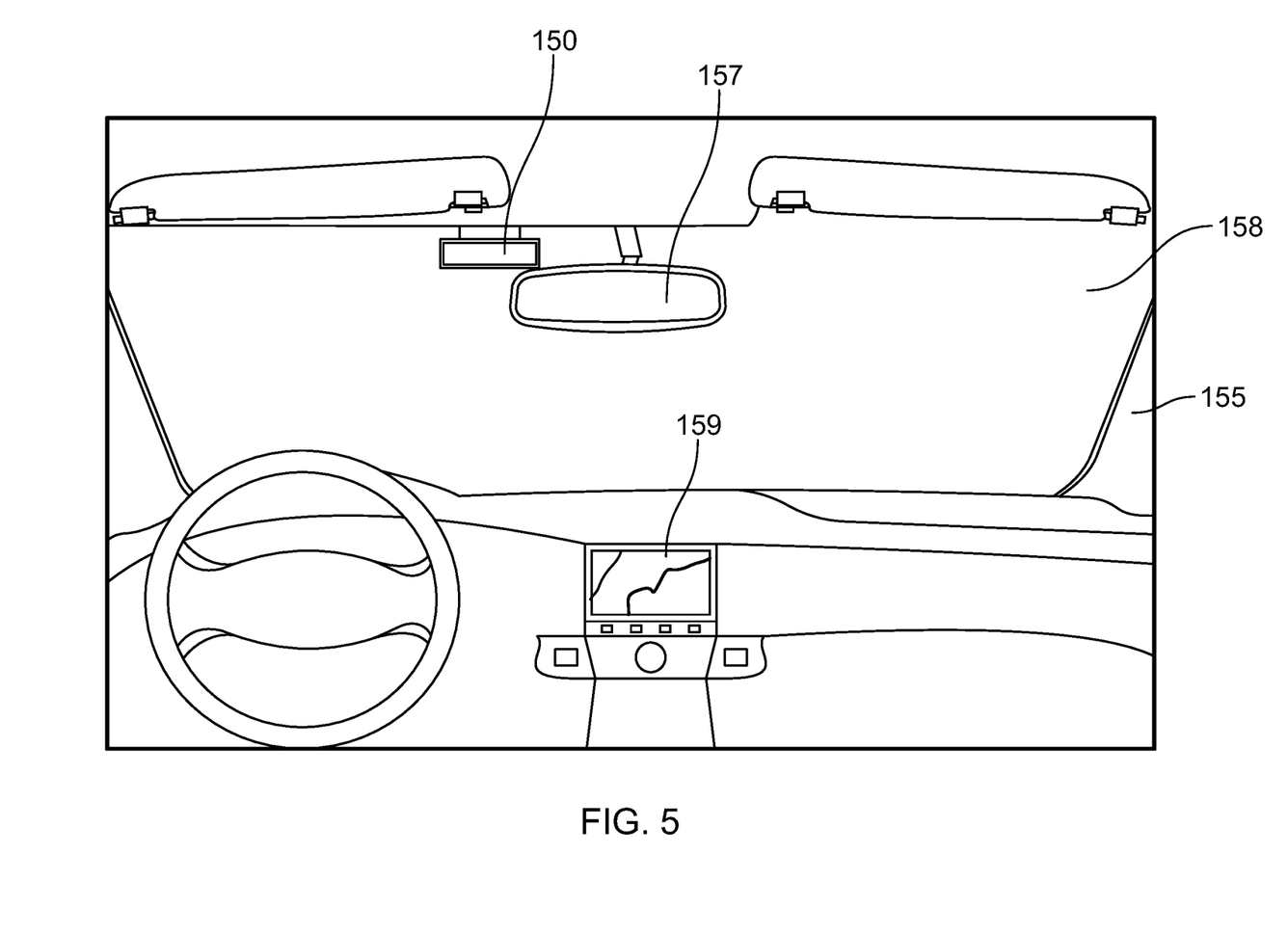
FIG. 5 illustrates the second system 150 installed in the second vehicle 155, in accordance with one embodiment of the present disclosure.

Referring to FIGS. 1, 3 and 5, the emergency warning system 100 further comprises a second system 150 provided in a second vehicle 155. The second vehicle 155 may indicate a non-emergency vehicle used by non-emergency personnel. In other words, the second vehicle 155 may indicate a vehicle owned by individuals. Examples of the second vehicle 155 may include, but not limited to, a car, a bus, a motorcycle, a bicycle, a truck, and so on.

The second system 150 may be installed inside the second vehicle 155. Referring to FIG. 5, the second system 150 installed in the second vehicle 155 is shown. As known, the second vehicle 155 may comprise a rear view mirror 157, a windshield 158, and a dashboard (not shown). The dashboard may comprise a display unit 159. In accordance with preferred embodiment of the present disclosure, the second system 150 is provided at back of the rear view mirror 157. Alternatively, the second system 150 may be provided at the dashboard of the second vehicle 155.

Referring to FIG. 3, a block diagram of the second system 150 is shown, in accordance with one embodiment of the present disclosure. The second system 150 may comprise a first processor 160, a first memory 165, a first interface 170, a first display unit 175, a first transceiver 180 and a first audio output 185.

The first processor 160 may be implemented as one or more microprocessors, microcomputers, controllers, digital signal processors, central processing units, state machines, logic circuitries, and/or any devices that manipulate signals based on operational instructions. Among other capabilities, the first processor 160 is configured to fetch and execute computer-readable instructions or program instructions stored in the first memory 165.

The first memory 165 may include any computer-readable medium known in the art including, for example, volatile memory, such as static random access memory (SRAM) and dynamic random access memory (DRAM), and/or non-volatile memory, such as read only memory (ROM), erasable programmable ROM, flash memories, hard disks, and so on.

The first interface 170 may include a variety of software and hardware interfaces, for example, a web interface, a graphical user interface, and the like. The first interface 170 may allow the second system 150 to interact with the user or customer directly or through other devices (not shown). In one example, the first interface 170 may include a touch screen interface.

The first display unit 175 may include a Light Emitting Diode (LED) or Liquid Crystal Display (LCD) screen configured to display text or video. In one example, the first display unit 175 may include a Light Emitting Diode (LED) lights.

The first transceiver 180 is used to transmit and receive signal/data from the second system 150 to external devices such as the first system 110, electronic device 200 or other devices.

The first audio output 185 may indicate a speaker capable of producing sound.

Although the present disclosure is explained considering that the second system 150 is provided at back of the rear view mirror 157, it should be understood that the second system 150 might be provided in other places in the second vehicle 155. In one implementation, the second system 150 may be integrated with onboard systems provided in the dashboard of the second vehicle 155.

Figure 4:
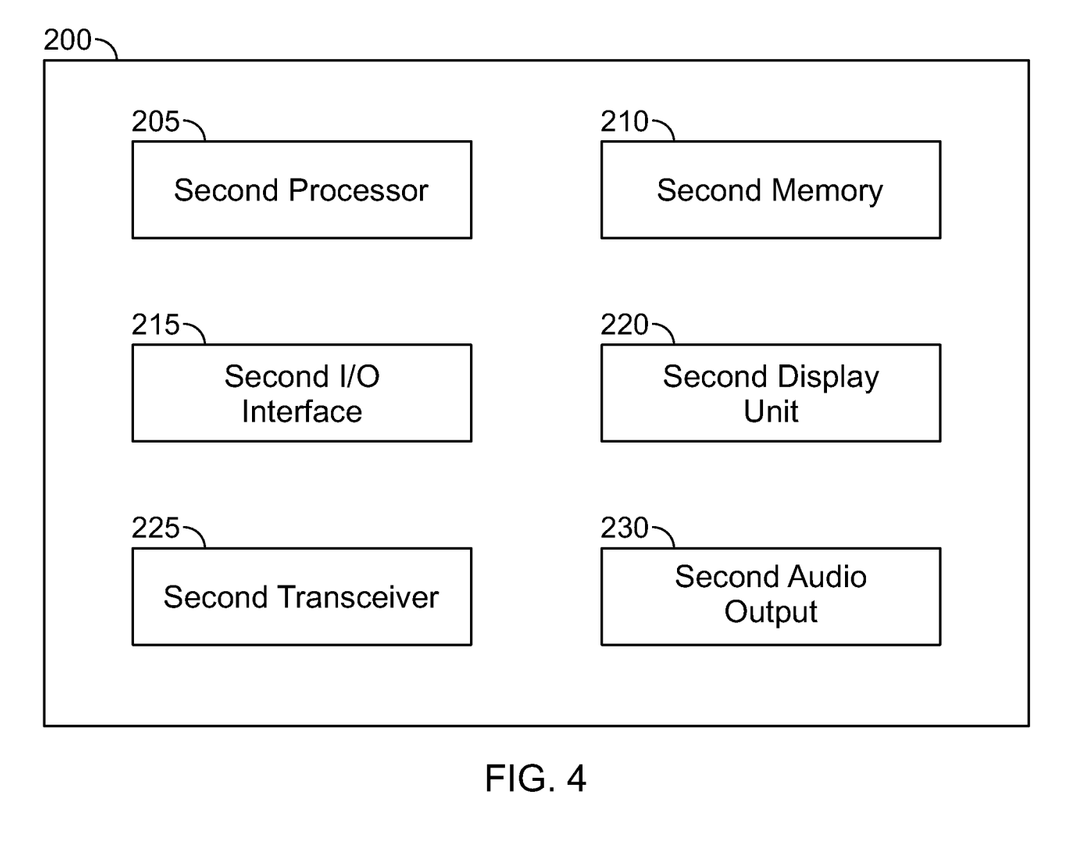
FIG. 4 illustrates a block diagram of the electronic device 200, in accordance with one embodiment of the present disclosure.

Referring to FIGS. 1 and 4, the emergency warning system 100 further comprises at least one electronic device 200. The electronic device 200 may include, but not limited to, a mobile phone, a tablet, a smart watch, a potable digital assistance device, a computer and so on. The electronic device 200 is communicatively coupled to the first system 110. Referring to FIG. 4, a block diagram of the electronic device 200 is shown. The electronic device 200 may comprise a second processor 205, a second memory 210, a second interface 215, a second display unit 220, a second transceiver 225 and a second audio output 230.

The second processor 205 may be implemented as one or more microprocessors, microcomputers, controllers, digital signal processors, central processing units, state machines, logic circuitries, and/or any devices that manipulate signals based on operational instructions. Among other capabilities, the second processor 205 is configured to fetch and execute computer-readable instructions or program instructions stored in the second memory 210.

The second memory 210 may include any computer-readable medium known in the art including, for example, volatile memory, such as static random access memory (SRAM) and dynamic random access memory (DRAM), and/or non-volatile memory, such as read only memory (ROM), erasable programmable ROM, flash memories, hard disks, and so on.

The second interface 215 may include a variety of software and hardware interfaces, for example, a web interface, a graphical user interface, and the like. The first interface 170 may allow the electronic device 200 to interact with the user or customer directly or through other devices (not shown). In one example, the second interface 215 may include a touch screen interface.

The second display unit 220 may include a Light Emitting Diode (LED) or Liquid Crystal Display (LCD) screen configured to display text or video.

The second transceiver 225 is used to transmit and receive signal/data from the electronic device 200 to external devices such as the first system 110, or other devices.

The second audio output 230 may indicate a speaker capable of producing sound.

As specified above, the emergency warning system 100 can be used to warn vehicles and electronic devices of approach of an emergency vehicle. In order to warn vehicles of approaching, consider a scenario in which emergency personnel are using the first vehicle 105 e.g., the emergency vehicle carrying a patient or police personnel responding to an emergency. When travelling alone a route, a driver of the first vehicle 105 may actuate the actuator 112. Upon actuation, the actuator 112 may trigger the siren 120 to produce loud sound indicating presence of the first vehicle 105. Concurrently and consequently, the actuator 112 may trigger the radio-frequency signal generator 120 to generate a signal. The signal may indicate presence or approach of the first vehicle or the emergency vehicle 105. Specifically, the radio-frequency signal generator 120 to generate the signal at a predefined frequency. Subsequently, the transmitter 125 may broadcast the radio frequency signal generated by the radio-frequency signal generator 120. As specified above, the transmitter 125 may broadcast the signal within a predefined range e.g., 500 meters.

The signal broadcasted by the transmitter 125 of the first system 110 may be received by the second system 150 in the second vehicle 155 and the electronic device 200 which are in the predefined range of the first vehicle 105. It should be understood that the second vehicle 155 and the electronic device 200 might subscribe to receive the alerts or notifications or signals from the first system 110. In another example, the signals may be broadcasted to second vehicles 155 and the electronic devices 200 within the predefined range of the first vehicle 105 without them subscribing to the first system 110.

When the signals are broadcasted, the first transceiver 180 of the second system 150 receives the signals broadcasted by the transmitter 125. Subsequently, the first transceiver 180 sends the signals to the first processor 160. After receiving the signals, the first processor 160 executes the program instructions stored in the first memory 165 to decode or process the signals.

If the signals decoded include a text message, then the first processor 160 may instruct the first display unit 175 to display the text indicating the presence or approach of the first vehicle 105. In one example, the first processor 160 may be configured to display text "Emergency vehicle is approaching, please give way" at the first display unit 175. Further, the first processor 160 may instruct the first display unit 175 to flash the display at a predefined rate in order to bring attention of the driver or passenger of the second vehicle 155 of the presence or approach of the first vehicle 105.

Further, the first processor 160 may instruct the first audio output 185 to announce the signal or sounds decoded from the first system 110 indicating the presence or approach of the first vehicle 105. In one example, the first processor 160 may be configured to announce "Emergency vehicle is approaching, please give way". Further, the first processor 160 may be configured to increase the sound as the first vehicle 105 is approaching the second vehicle 155 to get attention of the driver or passengers of the second vehicle 155.

After listening to the sound produced by the first audio output 185 or message displayed at the first display unit 175, the driver of the second vehicle 155 may move towards one side of the road to give way for the first vehicle 105.

Similarly, the electronic device 200 within the predefined range of the first system 110 receives the signals broadcasted by the transmitter 125. Specifically, the second transceiver 225 of the electronic device 200 receives the signals broadcasted by the transmitter 125. Subsequently, the second transceiver 225 sends the signals to the second processor 205. After receiving the signals, the second processor 205 executes the program instructions stored in the second memory 210 to decode or process the signals.

If the signals decoded include a text message, then the second processor 205 may instruct the second display unit 220 to display the text indicating the presence or approach of the first vehicle 105. In one example, the second processor 205 may be configured to display text "Emergency approaching, please give way" at the second display unit 220 indicating the presence or approach of the first vehicle 105.

Further, the second processor 205 may instruct the second audio output 230 to announce the signal or sounds decoded from the first system 110 indicating the presence or approach of the first vehicle 105. In one example, the second processor 205 may be configured to announce "Emergency approaching, please give way". Further, the second processor 205 may be configured to increase the sound as the first vehicle 105 is approaching the second vehicle 155 to get attention of a user of the electronic device 200.

After listening to the sound produced by the second audio output 230 or message displayed at the second display unit 220, the user of the electronic device 200 may give way for the first vehicle 105.

It should be understood that when the signal is transmitted from the first system 110, the signals are prioritized at the second system 150 and the electronic device 200. In other words, when the signals are received at the second system 150 or at the electronic device 200, the signals are processed by respective processors on priority basis to display or sound the alert sent by the first system 110.

Figure 6:
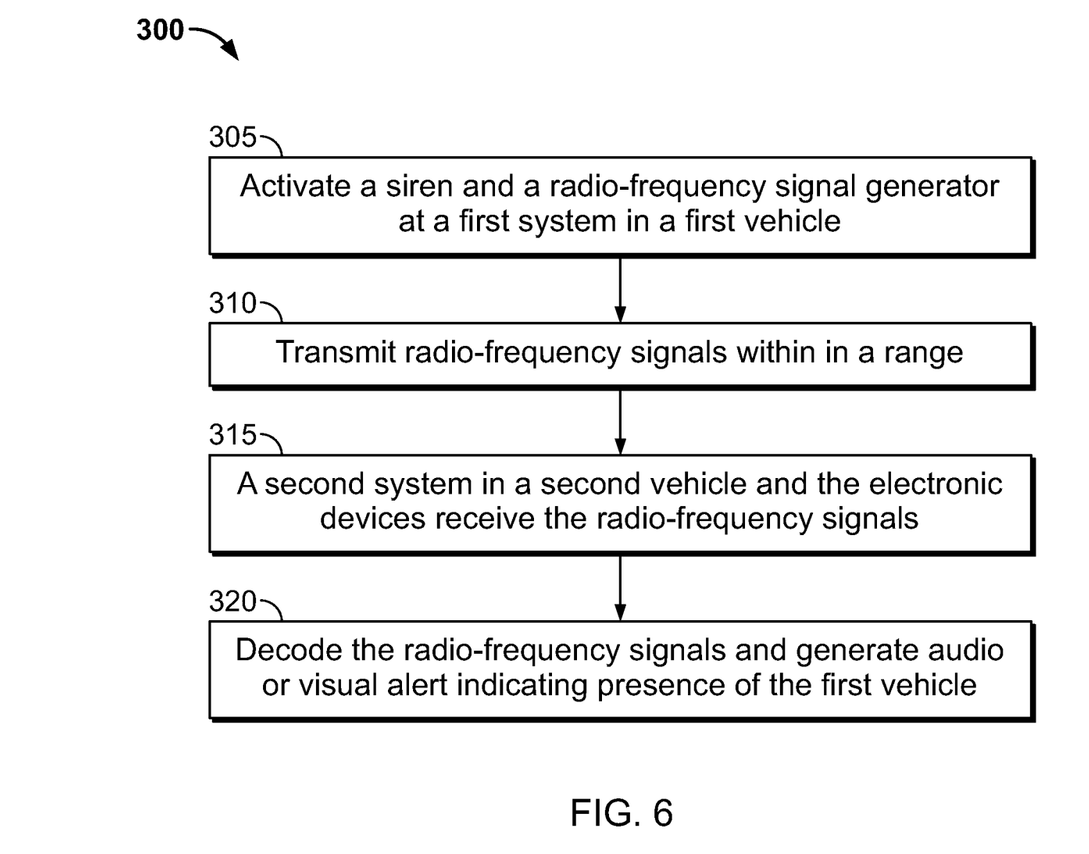
FIG. 6 illustrates method 300 of warning vehicles and electronic devices of approach of an emergency vehicle, in accordance with one embodiment of the present disclosure.

Referring to FIG. 6, a method 300 of warning vehicles and electronic devices of approach of an emergency vehicle is shown, in accordance with an embodiment of the present disclosure. The method 300 may be described in the general context of computer executable instructions or a sequence of steps to be performed for automated checkout. However, the order in which the method 300 is described and is not intended to be construed as a limitation, and any number of the described method blocks can be combined in any order to implement the method 200 or alternate methods. Additionally, individual blocks may be deleted from the method 300 without departing from scope of the disclosure described herein. For ease of explanation, in the embodiments described below, the method 300 may be implemented in the above-described emergency warning system 100.

At step 305, a first system 110 in a first vehicle 110, comprising an actuator 112 is actuated to activate a siren 115 and a radio-frequency signal generator 120.

At step 310, signals generated by the radio-frequency signal generator 120 is transmitted using a transmitter 125 of the first system 110. Specifically, the signals are transmitted or broadcasted at a particular frequency within a predefined area.

At step 315, the signals broadcasted may be received by a second system 150 in a second vehicle 155 and electronic devices 200 within the predefined area.

At step 320, each of the second system 150 in the second vehicle 155 and the electronic devices 200 decodes the signals and displays or announces the message broadcasted by the first system 110. Based on the message announced or displayed, respective users of the second vehicle 155 and the electronic devices 200 may be notified of the presence or approach of the first vehicle 105.

Based on the above, it is evident that the emergency warning system may be used to warn passengers inside vehicles and users of the electronic devices along the way of the emergency vehicles. In one example, the emergency warning system may be used without the presence of the siren as the radio-frequency signal generator may be used to alert the passengers in the vehicles and users of the electronic devices along the way.

Additionally, the emergency warning system may be used to broadcast warnings or safeguards issued by government authorities at the time of natural calamities or to provide precautionary measures in the event of unexpected situations. For example, the government authorities may use the emergency warning system to alert people of Tsunami or cyclone or wildfire or flood or weather warnings or any other incident.

It should be understood that the radio-frequency signal generator 120 and the transmitter 125 might be configured to broadcast the signals in a long range e.g., 5 kilometers or more. As such, the emergency warning system may be used to warn people in densely populated areas or remote areas at once.

It is to be noted that the emergency warning system may be used to broadcast a specific frequency wave message within a predefined distance of the emergency vehicle. The message may be received by anyone with matching frequency within the predefined distance of the emergency vehicle. The vehicles or the users of the electronic devices may receive the message in audio or visual format and may give way for the emergency vehicle.

The emergency warning system i.e., the first system may be pre-installed in a vehicle or may be provided as an accessory or auxiliary device that can be removably coupled in the vehicle using known mechanisms.

It should be understood that the emergency warning system might also be implemented at non-emergency vehicles. That is, the first system may be installed at a vehicle used for transporting building construction materials. As such, when the construction vehicle is travelling on the road, the emergency warning system may be activated such that the vehicles and people with electronic devices may get alert in the vicinity or along the way of the construction vehicle. This may help to reduce accidents caused due to construction vehicle or material hitting other vehicle or people accidently.

It must be noted that these are non-limiting examples, and the emergency warning system can be used in any vehicle to warn other vehicle or electronic devices in vicinity.

It is to be noted that the description provided above is to explain warning vehicles and electronic devices of approach of an emergency vehicles, it is obvious to implement the emergency warning system in non-moving structures i.e., fixed structures.

In one implementation, the emergency warning system may be provided at a building e.g., a construction site. The emergency warning system may be used to broadcast signals or messages that are indicative of a building that is under construction within a predefined area or at certain distance. The signal may be broadcasted at a predefined frequency such that vehicles equipped with the second system and the electronic devices within a predefined area may get alerts and maneuver with caution near the construction site. Based on the above, vehicles that are passing by, and pedestrians walking nearby the construction site may be warned of the presence of constructive site. Further, the emergency warn-ing system may be used to warn drivers of the vehicles used to carry material for constructions and/or workers working at the construction site. This feature allows reducing accidents or injuries or fatalities at the construction sites. Further, the emergency warning system may be used to pre-warn unsuspected people from driving/walking into a potentially dangerous incident.

Further, the emergency warning system may also be used at skyscrapers or other buildings to warn nearby pedestrians of the fire/smoke alarms, bank silent hold-up alarms, threats, etc. Further, the emergency warning system may be used to alert or warn people in a vicinity of any incident or danger or threat caused by other individuals in the building.

Similarly, the emergency warning system may also be implemented at Draw Bridge signals, railroad train crossing, or school zones, cross walks, and other road warning and/or road closure signs to warn vehicles or pedestrians of train or road construction or presence of children. This feature will avoid fatal accidents by warning the approaching vehicles or pedestrians beforehand.

Further, the emergency warning system may also be implemented at Highway/Road construction zones for warning drivers and pedestrians. This helps in reducing fatal accidents, where flaggers and road construction people have been injured and killed on a regular basis by unsuspected and/or distracted drivers entering Highway/Road construction zones.

In another implementation, the emergency warning system may also be coupled with a server i.e., a cloud server over Internet, such that the warnings may be broadcasted over a long range/distance using different map/travel advisories such as Google Maps™, MapQuest™, Yahoo Maps™, AppleMaps™, MapsMe™, Bing Maps™, etc. This feature may be employed when government wishes to issue warnings in case of an emergency and/or critical incidents such as floods, tsunami and other major warnings.

The warnings may be issued by varying the frequency such that vehicles and electronic devices can identify the warnings when government or construction vehicles, buildings, or signboards issue an alert.

When the government issues the warnings or announcements, then the warnings are prioritized indicating that the warning will override the vehicle audio or video system and play or announce the warning. This is done to get the attention of the occupants of the vehicles or electronic devices. One or more signals/warnings may be provided to the driver and/or electronic device operator or pedestrians to get their attention so that they can pay attention to the warnings.

It is to be understood that the emergency warning system may be fitted to the vehicles or in the electronic devices either at the time of manufacturing or may be fitted as an accessory to existing vehicles or the electronic devices.

The foregoing description conveys the best understanding of the objectives and advantages of the present invention. Different embodiments may be made of the inventive concept of this invention. It is to be understood that all matter disclosed herein is to be interpreted merely as illustrative, and not in a limiting sense.

What is claimed is:

1. An emergency warning system, comprising:
a first system provided in a first vehicle, comprising:
an actuator;
a radio-frequency signal generator communicatively coupled to the actuator, wherein the radio-frequency signal generator generates a radio frequency signals at a particular frequency; and a transmitter communicatively coupled to the radio-frequency signal generator, wherein the transmitter is used to broadcast the signals generated by the radio-frequency signal generator, wherein said first system including said actuator, said radio frequency generator, and said transmitter are enclosed within a first housing and mounted within said first vehicle, wherein said first system is mounted entirely behind a rear view mirror of said first vehicle, wherein said first system and said rear view mirror of said first vehicle are provided as separate structures within said first vehicle;

a second system provided in a second vehicle, wherein the second vehicle is a non-emergency vehicle, wherein the second system comprises:

a transceiver to receive the signals transmitted by the first system; and a first processor coupled to the transceiver, wherein the first processor is configured to process the signals and display or announce a message indicative of approach of the first vehicle within a predefined distance, wherein said second system including said transceiver and said first processor are enclosed within a second housing and mounted within said second vehicle, wherein said second system is mounted entirely behind a rear view mirror of said second vehicle, wherein said second system and said rear view mirror of said second vehicle are provided as separate structures within said second vehicle, wherein said second system generates an audio or visual alert when detecting the presence of said first vehicle; and at least one electronic device present within the predefined distance of the first system, wherein the at least one electronic device comprises:

a second transceiver to receive the signals transmitted by the first system; and a second processor coupled to the second transceiver, wherein the second processor is configured to process the signals and display or announce a message indicative of approach or presence of the first system within a predefined distance, wherein the actuator is actuated to trigger the radio-frequency signal generator to generate the signals and the transmitter broadcasts the signals which are received by the second system and the at least one electronic device, wherein the second system and the at least one electronic device processes the signals and display or announce the message indicative of approach or presence of the first system within the predefined distance.

2. The emergency warning system of claim 1, wherein the first system is installed in said first vehicle indicative of an emergency vehicle.

3. The emergency warning system of claim 1, wherein the first system is installed in a building or highway or road construction zone.

4. The emergency warning system of claim 1, wherein the second system comprises a display unit to display the message received in the signals, wherein said display unit flashes at a predetermined rate to bring attention to a driver within said second vehicle.

5. The emergency warning system of claim 1, wherein the second system comprises an audio output to announce the message received in the signals.

6. The emergency warning system of claim 1, wherein the electronic device comprises a display unit to display the message received in the signals.

7. The emergency warning system of claim 1, wherein the electronic device comprises an audio output to announce the message received in the signals.

8. The emergency warning system of claim 1, wherein the electronic device is one of a mobile phone, a tablet, a smart watch and a personal digital assistance device.

\* \* \* \* \*